Nov. 15, 1955   D. FRASER   2,724,106
ICING DETECTOR
Filed April 13, 1953   2 Sheets-Sheet 2
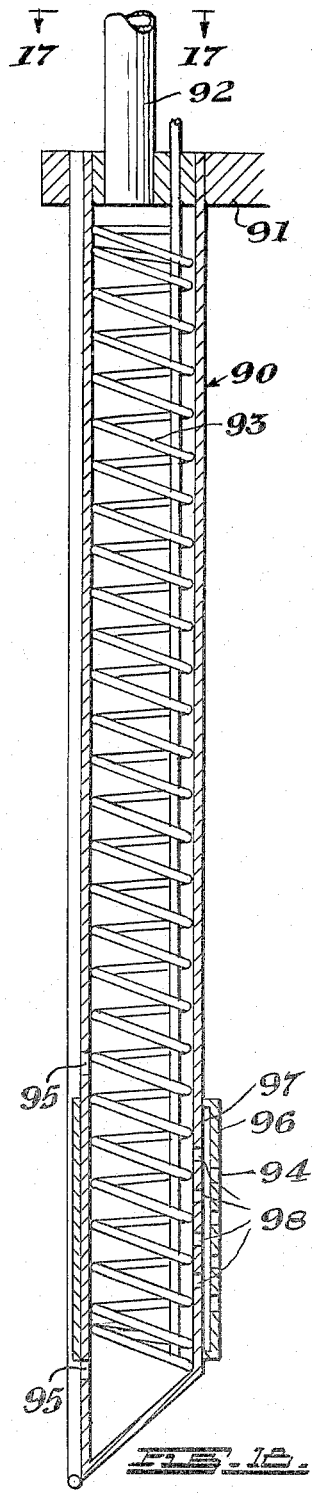
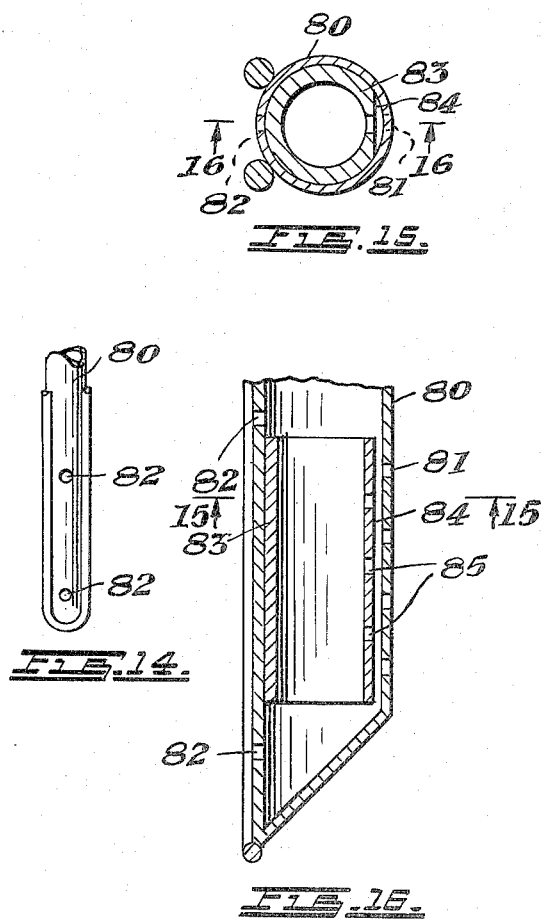
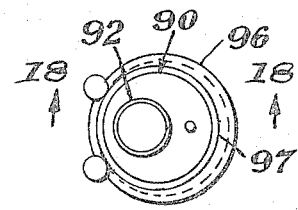
INVENTOR
DONALD FRASER
By— Smart & Biggar
ATTORNEYS United States Patent Office 2,724,106
Patented Nov. 15, 1955

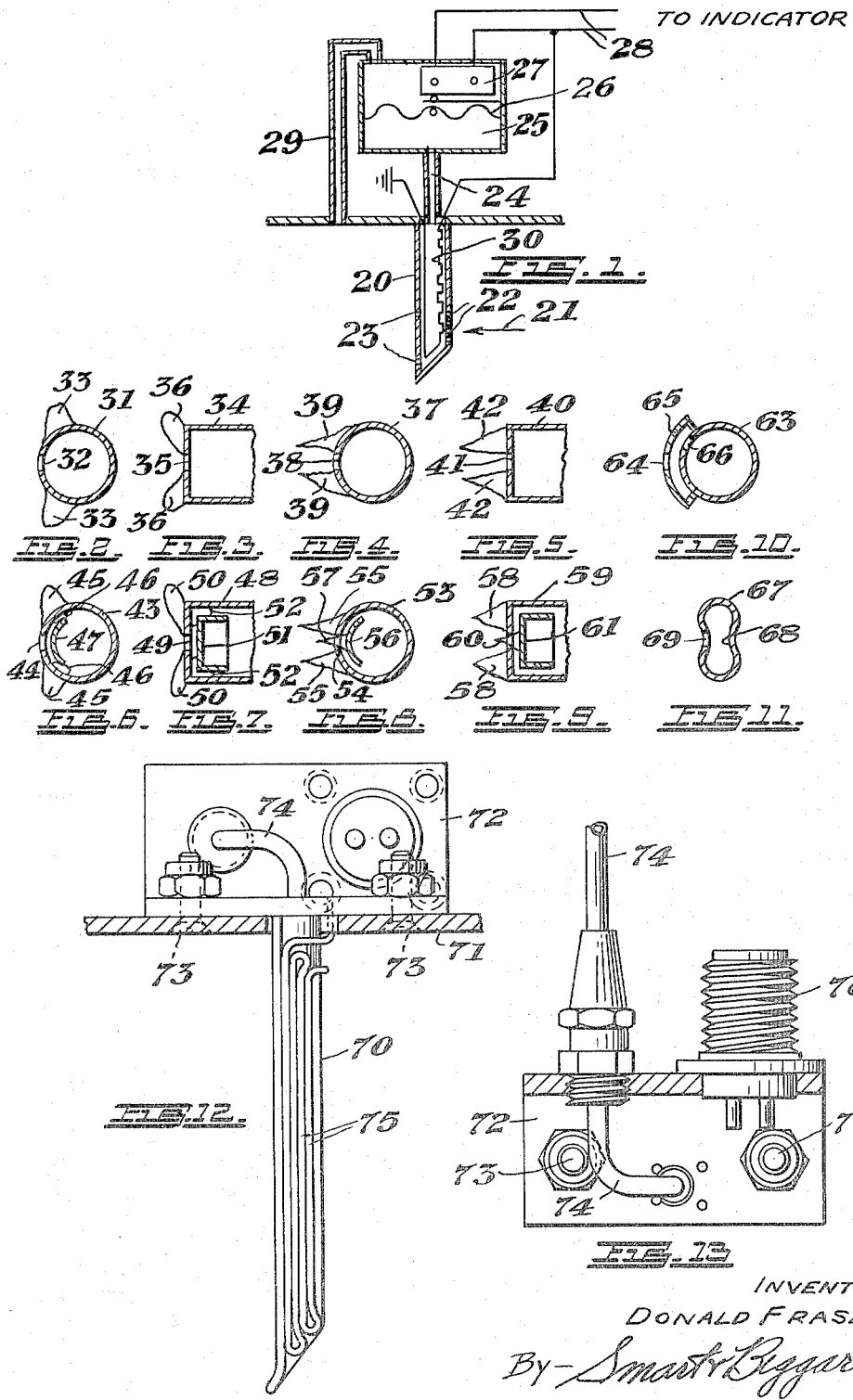

2,724,106
ICING DETECTOR
Donald Fraser, Ottawa, Ontario, Canada, assignor to National Research Council, Ottawa, Ontario, Canada, a body corporate Application April 13, 1953, Serial No. 348,243
10 Claims. (Cl. 340—234)

The invention relates to an icing detector for detecting icing conditions in an airstream such as flows about an aircraft in flight.

Certain types of icing detectors for aircraft consist of probes of which the leading edges have pressure holes facing into the airstream. Under non-icing conditions these pressure holes create a positive pressure (that is a pressure higher than the ambient static atmospheric pressure) in the probe which is transmitted to some form of pressure indicating device. When icing conditions are encountered the resultant ice formation on the probe tends to block or restrict the flow through the pressure holes thus lowering the positive pressure, or even, in certain cases changing the pressure from positive to negative (that is below static pressure). This change of pressure is transmitted to a pressure indicating device and causes it to indicate the presence of icing conditions.

Prior to the present invention, probes for this type of icing detector have consisted of a tube adapted to extend into the airstream and having pressure holes opening directly to the interior of the tube. This type of probe is satisfactory for some conditions of icing but there are at least two conditions of icing when this prior type of probe may fail to indicate icing. The first is when the ambient air temperature is just below freezing. At this temperature ice may not form on the stagnation line of the probe and may instead form on the back or sides. Thus, the resulting ice formation does not block or restrict the flow of air through the pressure holes in the forward part of the probe and therefore no indication of icing conditions is provided. The second condition when the prior type of probe may fail to indicate icing is associated with low ambient air temperatures and/or low rates of water-catch. Under this condition a form of rime icing is produced which will not block the pressure holes in the probe since the individual supercooled cloud droplets freeze on impact without spreading. Under these conditions the droplets build up ice about the pressure holes without spreading across them and therefore do not produce any noticeable change in pressure within the probe.

These disadvantages of the prior art type of detectors are avoided by the present invention by providing a baffle behind the pressure holes so as to deflect the airflow which has entered the probe through the pressure holes. Preferably, the spacing of the baffle behind the pressure holes is less than 0.026 inch, and the baffle may be provided with perforations offset from the pressure holes so that the baffle does not in itself appreciably restrict the flow of air through the pressure holes into the probe. The baffle does, however, provide a constricted passage through which the air must flow and also provides a solid surface immediately behind the pressure walls so that droplets of water entering the pressure holes impinge upon the baffle building up ice formation which restricts or blocks the airflow through the pressure holes thus affecting the pressure within the probe. In the case of the high temperature icing condition supercooled droplets entering the pressure holes with the airflow will form ice in the channel formed between the baffle and the inner surface of the probe so that airflow through this channel is blocked or restricted thus affecting the pressure in the probe. For the low temperature, low water-catch conditions, the supercooled droplets entering the pressure holes will freeze when they impinge on the baffle and will build up on the baffle until the resulting ice formation blocks or restricts the pressure holes thus affecting the pressure within the probe.

In a preferred form of the invention a cylindrical tube is closely fitted within the probe behind the pressure holes and has a flattened side next the pressure holes thereby providing a baffle or airflow through the pressure holes. In another preferred form of the invention the probe comprises a first cylindrical tube adapted to extend into the airstream and having at least one pressure hole and a second cylindrical tube of greater diameter than the outer diameter of the first tube fitted over the first tube and fixed thereto so that part of the inner surface of the second tube is in contact with the outer surface of the first tube, and part of the inner surface of the second tube is spaced from the outer surface of the first tube at the location of the pressure hole. There is at least one pressure hole in the second tube opening into the space between the first and second tubes at a point offset from the pressure hole in the first tube so that the outer surface of the first tube forms the baffle.

In still another preferred form of the invention, the inner surface of the wall of the probe for a substantial area opposite the pressure holes has a maximum clearance from the pressure holes of less than 0.026 inch. In this case a part of the inner surface of the wall of the probe forms the baffle behind the pressure holes.

The words "tube" and "tubular" as used in this specification mean, or refer to, a hollow body whether cylindrical or of other shape.

The invention will be further described with reference to the attached drawings, in which Figure 1 is a schematic drawing showing a prior art type of icing detector, to which the present invention is applicable;

Figures 2 to 5 show ice formations on prior art types of probes which do not restrict or block airflow through the pressure holes;

Figures 6 to 9 show ice formations on probes in accordance with the present invention;

Figures 10 and 11 show two further constructions of probes in accordance with the invention;

Figure 12 is a side view of a probe showing its mounting and heater;

Figure 13 is a plan view of the probe and mounting shown in Figure 12;

Figures 14, 15 and 16 are views of a probe in accordance with the invention; and Figures 17 and 18 are views of another construction of a probe in accordance with the invention.

As shown in Figure 1, an icing detector system may comprise a probe 20 mounted so as to extend into an airstream (indicated by an arrow 21) and having upstream pressure holes 22 and downstream pressure holes 23. The probe is connected by a tube 24 to a diaphragm type pressure switch 25 having a diaphragm 26. The diaphragm 26 is arranged to operate a microswitch 27 which is connected to an indicator (not shown) by connections 28. A tube 29 is arranged to supply static presure to the diaphragm switch 25. Electrical connections are provided in the usual manner to a de-icing heater 30.

This icing detector system shown in Figure 1, is conventional in its construction and operation. Under conditions in which ice is not formed on surfaces extending into the airstream 21, the air entering the upstream pressure holes 22 causes a positive pressure within the probe 20 which acts upon the diaphragm 26 of the diaphragm switch 25 to hold the microswitch 27 in one of its positions. When icing conditions are encountered, provided they are a type which cause the ice to spread across the pressure holes 22, the airflow through the pressure holes 22 is restricted or blocked thereby reducing the air pressure within the probe 20 and causing the diaphragm 26 to relax and operate the microswitch 27. Upon operation of the microswitch 27 the indicator is energized thereby warning the pilot that ice is forming on the exposed surfaces of the aircraft. In accordance with the usual practice the electrical circuits are arranged to energise the heater 30 so as to de-ice the probe 20 at intervals.

Figures 2 and 3 illustrate a type of ice formation which may be encountered and which does not restrict or block the pressure holes in the prior art type of probe. This condition occurs when the ambient air temperature is just below freezing and which causes the ice to form on the back or sides of the probe. As shown in Figure 2 a probe 31 has a pressure hole 32 and ice formations 33; in Figure 3 a probe 34 has a pressure hole 35 and ice formations 36.

Figures 4 and 5 illustrate another icing condition in which airflow into the probe is not restricted or blocked and therefore no indication of icing is given. As shown in Figure 4 a probe 37 has a pressure hole 38 and water droplets impinging on the probe 37 have made ice formations 39. Another prior construction of probe is shown in Figure 5 in which a probe 40 has a pressure hole 41 and impinging droplets of water have made ice formations 42. Figures 4 and 5 illustrate the icing conditions associated with low ambient air temperatures and/or low rates of water-catch in which a form of rime icing is produced which will not block the pressure holes since individual supercooled droplets freeze on impact without spreading.

Figures 6 and 7 show probes in accordance with the present invention with sections corresponding to the sections of prior art probes shown in Figures 2 and 3 and with ice formations formed under the same conditions as ice formations 33 and 36 shown in Figures 2 and 3. In Figure 6 a probe 43 has a presure hole 44 and impinging droplets of moisture have made ice formations 45 and 46. The ice formations 45 correspond in shape and position to the ice formations 33 formed on the probe 31 shown in Figure 2. The probe 43 in accordance with the present invention has a baffle 47 fixed behind the pressure hole 44 and as a result the impinging droplets of moisture which enter the pressure hole 44 and impinge upon the baffle 47 form the ice formations 46 in the channel between the baffle 47 and the inner wall of the probe 43. The ice formations 46 restrict or block the flow of air in the channel between the baffle 47 and the inner wall of the probe 43 thereby changing the air pressure within the probe and providing an indication of icing conditions.

Figure 7 shows a section of a probe constructed in accordance with the present invention and having a section corresponding to the section of the prior art type of probe shown in Figure 3. The ice formations formed on the probe shown in Figure 7 correspond to those shown in Figure 3. As shown in Figure 7 a probe 48 has a pressure hole 49 and impinging droplets of moisture have made ice formations 50. The ice formations 50 correspond to the ice formations 36 shown in Figure 3. However, the probe shown in Figure 7 has a baffle 51 fixed behind the pressure hole 49 in accordance with the present invention so that droplets of moisture entering the pressure hole 49 impinge upon the baffle 51 and make ice formations 52 which restrict or block air flow between the baffle 51 and the inner wall of the probe 48 thereby changing the pressure within the probe 48 and providing an indication of icing conditions.

Figures 8 and 9 show probes constructed in accordance with the present invention and having sections corresponding to the sections of the prior art type of probes shown in Figures 4 and 5. The ice formations shown in Figures 8 and 9 are formed under similar conditions to the ice formations 39 and 42 shown in Figures 4 and 5. As shown in Figure 8, a probe 53 has a pressure hole 54 and moisture impinging on the outer surface of the probe 53 has made ice formations 55. The ice formations 55 correspond to the ice formations 39 shown in Figure 4. The probe shown in Figure 8 is fitted with a baffle 56 in accordance with the present invention so that moisture entering the probe 53 through the pressure hole 54 impinges on the baffle 56 making an ice formation 57 which restricts or blocks air flow through the pressure hole 54. This illustrates the type of icing condition associated with low ambient air temperatures and/or low rates of water-catch when a form of rime ice is produced in which the individual super-cooled cloud droplets freeze on impact without spreading.

Figure 9 shows a section of a probe in accordance with the present invention corresponding to the section of the prior art type of probe shown in Figure 5 and having ice formations 58 corresponding to the ice formations 42 shown in Figure 5. The probe 59 shown in Figure 9 has a pressure hole 60 and is fitted with a baffle 61 in accordance with the present invention. As in the case of the probe shown in Figure 8 the baffle 61 has served to cause an ice formation 62 which restricts or blocks the pressure opening 60. The icing conditions under which these ice formations are formed are the same as those described in connection with Figures 5 and 8.

Figure 10 is a cross section of a probe 63 in which a pressure hole 64 is formed in a curved wall 65 fitted to the exterior of the probe 63. The tube 63 has an opening 66 between the space behind the wall 65 and the interior of the tube 63. The opening 66 is offset from the pressure hole 64 so that a part of the exterior wall of the tube 63 forms a baffle behind the pressure hole 64.

Figure 11 shows a cross section of another form of probe in accordance with the present invention in which a tube 67 forming the probe has been formed into a figure 8 shape so that a part 68 of the inner surface of the wall of the tube 67 for a substantial area opposite to the pressure hole 69 is only a small distance from the pressure hole 69 thereby forming a baffle for air entering through the pressure hole 69.

Figures 12 and 13 show the general construction of a probe for an icing detector and its mounting to the surface of an aircraft. A probe 70 is mounted to the exterior surface 71 of an aircraft by means of a bracket 72, and screw-nut assemblies 73. The probe 70 is fitted with a pressure tube 74 having connection to a pressure operated switch and an electric heater element 75 is fitted to the exterior of the probe 70. A plug 76 is provided for the electric connections to the heater 75. This construction is well known and the exterior shape of the probe 70 and the heater 75 is conventional.

A construction of a probe in accordance with the present invention is shown in Figures 14, 15 and 16. In these figures a probe 80 having upstream pressure holes 81 and downstream pressure holes 82 is fitted with an inner tube 83 behind the upstream pressure holes 81. The inner tube 83 has a flattened side 84 having perforations 85. The perforations 85 are offset from the pressure holes 81 so that air entering the pressure holes 81 must flow along the flattened surface 84. The flattened surface 84 forms a baffle which will produce ice formations such as those shown in Figures 6, 7, 8 or 9 under the icing conditions described in connection with those figures.

Figure 18 shows a section of a probe 90 which is constructed in accordance with the present invention. The probe 90 is shown mounted from an external wall 91 of an aircraft and has a pressure tube 92 connecting it to a pressure operating switch. The probe 90 is fitted internally with an electric heater element 93 in a conventional manner. The probe 90 has upstream pressure holes 94 and downstream pressure holes 95. The upstream pressure holes 94 are formed in an external cylindrical tube 96 which surrounds a tube 97 extending up to the wall 91 of the aircraft. The tube 97 has perforations 98 in its surface behind the pressure holes 94. The perforations 98 are offset from the pressure holes 94 so that air entering the pressure holes 94 must flow along the surface of the tube 97 and then through the perforations 98.

With this construction ice formations such as those shown in Figures 6 to 9 are formed between the tubes 96 and 97 under the icing conditions described in connection with those figures.

In any of the constructions in accordance with the present invention, the distance of the baffle behind the pressure holes should be determined by the degree of sensitivity required of the icing detector probe. It has been found that this distance should not exceed 0.026 inch for the sensitivity usually required of icing detector probes. Less spacing may be used, but a passageway must always be provided between the baffle and the inner surface of the wall through which the upstream pressure holes are formed. The probes used in icing detectors are commonly in the form of a cylindrical tube but, if desired, other shapes of tube may be used.

What I claim as my invention is:

1. An icing detector for detecting icing conditions in an airstream comprising pressure operated means, an indicator responsive to said means, a tubular probe adapted to extend into the airstream and having at least one upstream pressure hole, said probe being adapted and connected to supply air pressure to said pressure operated means, and baffle means arranged behind said pressure hole to deflect airflow which has entered said probe through said pressure hole, the area of said pressure hole being substantially smaller than the effective area of said baffle means.

2. An icing detector as claimed in claim 1 in which the spacing of the baffle means behind the upstream pressure hole in the probe is less than 0.026 inch.

3. An icing detector as claimed in claim 2 in which the baffle means has at least one perforation at a point offset from the pressure hole in the probe.

4. An icing detector as claimed in claim 1 in which the baffle means is part of the outer surface of the wall of a cylindrical tube and the upstream pressure hole is through a wall fixed to the exterior of said cylindrical tube and spaced therefrom, said baffle means having at least one perforation at a point offset from said upstream pressure hole.

5. An icing detector as claimed in claim 4 in which the spacing between the exterior surface of the wall of the cylindrical tube and the wall fixed thereto is less than 0.026 inch in the vicinity of the upstream pressure hole.

6. An icing detector as claimed in claim 5 in which the space between the exterior surface of the wall of the cylindrical tube and the wall fixed thereto is airtight other than for the pressure hole and perforation opening into it.

7. An icing detector for detecting icing conditions in an airstream comprising pressure operated means, an indicator responsive to said means, a cylindrical tubular probe adapted to extend into the airstream and having at least one upstream pressure hole, said probe being adapted and connected to supply air pressure to said pressure operated means, a cylindrical tube closely fitted within said probe behind said pressure hole and having a flattened side next said pressure hole thereby providing a baffle for airflow through said pressure hole.

8. An icing detector as claimed in claim 7, in which the surface of the said flattened side is spaced behind the pressure hole so as to provide a maximum clearance of less than 0.026 inch to the inner surface of the probe.

9. An icing detector as claimed in claim 8, in which the cylindrical tube within the probe has at least one hole through its flattened side at a point offset from the pressure hole in the probe.

10. An icing detector as defined in claim 1 in which the baffle means is formed by the inner surface of the tubular probe and the spacing of said baffle means behind the upstream pressure hole in the probe is less than 0.026 inch.

References Cited in the file of this patent

FOREIGN PATENTS

| | | |
|---|---|---|
| 213,362 | Switzerland | Jan. 31, 1941 |
| 446,983 | Great Britain | May 11, 1936 |
| 626,543 | Great Britain | July 18, 1949 |